United States Patent
Flanagan et al.

(10) Patent No.: US 9,664,382 B2
(45) Date of Patent: May 30, 2017

(54) METHOD AND DEVICE FOR FUEL AND POWER GENERATION BY CLEAN COMBUSTION OF ORGANIC WASTE MATERIAL

(75) Inventors: Christopher Flanagan, Revere, MA (US); Anna Craver, Boston, MA (US); Brittne Rose Lynn, Weymouth, MA (US); Mason Riley, Halifax, MA (US); Katherine Dixon, Wilbraham, MA (US); Chuanwei Zhuo, Malden, MA (US); Yiannis Levendis, Boston, MA (US)

(73) Assignee: NORTHEASTERN UNIVERSITY, Boston, MA (US)

( * ) Notice: Subject to any disclaimer, the term of this patent is extended or adjusted under 35 U.S.C. 154(b) by 880 days.

(21) Appl. No.: 13/991,086

(22) PCT Filed: Dec. 5, 2011

(86) PCT No.: PCT/US2011/063306
§ 371 (c)(1),
(2), (4) Date: Jan. 10, 2014

(87) PCT Pub. No.: WO2012/075499
PCT Pub. Date: Jun. 7, 2012

(65) Prior Publication Data
US 2014/0109545 A1    Apr. 24, 2014

Related U.S. Application Data

(60) Provisional application No. 61/419,492, filed on Dec. 3, 2010.

(51) Int. Cl.
*F23G 5/00*    (2006.01)
*F23G 5/38*    (2006.01)
(Continued)

(52) U.S. Cl.
CPC ............... *F23G 5/38* (2013.01); *C10B 47/06* (2013.01); *C10B 53/07* (2013.01); *C10G 1/002* (2013.01);
(Continued)

(58) Field of Classification Search
USPC ........ 585/240, 241, 806, 774; 110/229, 346; 60/39.12
See application file for complete search history.

(56) References Cited

U.S. PATENT DOCUMENTS 3,714,038 A * 1/1973 Marsh .................. B03B 9/06
110/221
4,795,340 A   1/1989 Bader
(Continued)

FOREIGN PATENT DOCUMENTS

JP    2006111517 A    4/2006
WO    WO 2006/011655 A1    2/2006
(Continued)

OTHER PUBLICATIONS

International Search Report and Written Opinion issued by the U.S. Patent and Trademark Office as International Searching Authority for Application No. PCT/US2011/063306 dated Mar. 29, 2012 (8 pages).
(Continued)

*Primary Examiner* — Jacob K Ackun
(74) *Attorney, Agent, or Firm* — Hamilton, Brook, Smith & Reynolds, P.C.

(57) ABSTRACT

Disclosed herein are systems and methods for the conversion of solid organic waste material, such as waste plastics, into fuel for the generation of heat and power. In addition, embodiments of the systems and methods disclosed herein relate to converting solid organic waste material into a gasified material for mixing with an oxidizing gas to allow
(Continued)

for clean combustion of the fuel, thereby minimizing emissions of pollutants.

13 Claims, 10 Drawing Sheets

(51) Int. Cl.
| | |
|---|---|
| C10B 47/06 | (2006.01) |
| C10B 53/07 | (2006.01) |
| C10G 1/10 | (2006.01) |
| F23G 5/027 | (2006.01) |
| F23L 7/00 | (2006.01) |
| F23G 5/46 | (2006.01) |
| F23G 7/10 | (2006.01) |
| F23G 7/12 | (2006.01) |
| C10G 1/00 | (2006.01) |
| C10G 1/02 | (2006.01) |
| F02C 3/28 | (2006.01) |

(52) U.S. Cl.
CPC .............. *C10G 1/02* (2013.01); *C10G 1/10* (2013.01); *F02C 3/28* (2013.01); *F23G 5/027* (2013.01); *F23G 5/46* (2013.01); *F23G 7/105* (2013.01); *F23G 7/12* (2013.01); *F23L 7/007* (2013.01); *C10G 2300/1003* (2013.01); *C10G 2300/1011* (2013.01); *F23G 2201/303* (2013.01); *F23G 2202/30* (2013.01); *F23G 2206/202* (2013.01); *F23G 2206/203* (2013.01); *F23G 2900/50205* (2013.01); *Y02E 20/12* (2013.01); *Y02E 20/344* (2013.01); *Y02P 20/143* (2015.11); *Y02P 20/145* (2015.11); *Y02P 30/20* (2015.11)

(56) References Cited

U.S. PATENT DOCUMENTS

| | | | |
|---|---|---|---|
| 4,930,535 | A | 6/1990 | Rinehold |
| 6,830,597 | B1 | 12/2004 | Green |
| 7,819,070 | B2 | 10/2010 | Rehmat et al. |
| 9,051,185 | B2 | 6/2015 | Levendis et al. |
| 2003/0044342 | A1 | 3/2003 | Alford et al. |
| 2003/0143151 | A1 | 7/2003 | Diener et al. |
| 2004/0062704 | A1 | 4/2004 | Allison et al. |
| 2004/0179989 | A1 | 9/2004 | Height et al. |
| 2005/0163696 | A1 | 7/2005 | Uhm et al. |
| 2005/0238566 | A1 | 10/2005 | Rao et al. |
| 2006/0280669 | A1* | 12/2006 | Jones ............... C10B 7/10 423/445 R |
| 2007/0183959 | A1 | 8/2007 | Charlier et al. |
| 2008/0318049 | A1 | 12/2008 | Hata |
| 2009/0062581 | A1* | 3/2009 | Appel ............... C10G 1/002 585/241 |
| 2009/0274609 | A1 | 11/2009 | Harutyunyan et al. |
| 2010/0155216 | A1 | 6/2010 | Benham |
| 2015/0266738 | A1 | 9/2015 | Levendis et al. |

FOREIGN PATENT DOCUMENTS

| | | |
|---|---|---|
| WO | WO 2006/050903 A2 | 5/2006 |
| WO | WO-2009/060461 A2 | 5/2009 |
| WO | WO-2010/111624 A1 | 9/2010 |
| WO | WO 2012/075499 A1 | 6/2012 |

OTHER PUBLICATIONS

Bartok et al., *Fossil Fuel Combustion, A Source Book*, A Wiley-Interscience Publication, John Wiley & Sons, Inc., New York, 1991 (pp. 802-806, 7 pages total).
Bittencourt, Jose A., *Fundamentals of Plasma Physics*, Springer, 2004 (pp. 1-32, 35 pages total).
Blank, V. D. et al., "TEM Studies of Carbon Nanofibres Formed on Ni Catalyst by Polyethylene Pyrolysis," *Nanotechnology*, 17.8: 1862 (2006).
Boslaugh, S., "Pyrolysis," Encyclopedia Brittanica, Downloaded from http://www.britannica.com/Ebchecked/topic/484978/pyrolysis on Jul. 16, 2014 (2 pages).
English Machine Translation of JP 2006111517A.
International Preliminary Report on Patentability for Int'l Application No. PCT/US10/28876, titled: Carbon Nanostructures From Pyrolysis of Organic Materials, Date of Issuance: Sep. 27, 2011.
International Preliminary Report on Patentabiltiy for Int'l Application No. PCT/US2011/063306, titled: Method and Device for Fuel and Power Generation by Clean Combustion of Organic Waste Material, Date of Issuance: Jun. 4, 2013.
International Search Report for Int'l Application no. PCT/US10/28876, titled: Carbon Nanostructures From Pyrolysis of Organic Materials, Date Mailed: May 4, 2010.
Jiang, Z. et al., "Polypropylene as a Carbon Source for the Synthesis of Multi-walled Carbon Nanotubes via Catalytic Combustion," *Carbon*, 45: 449-458 (2007).
Kiselev, N. A. et al., "Carbon Nanotubes from Polyethylene Precursors: Structure and Structural Changes Caused by Thermal and Chemical Treatment Revealed by HREM," *Carbon*, 36.7: 1149-1157 (1998).
Kumar, M. and Y. Ando, "Controlling the Diameter Distribution of Carbon Nanotubes Grown from Camphor or a Zeolite Support," *Carbon*, 43.3: 533-540 (2005).
Ludlow-Palafox, C. and H.A. Chase, "Microwave-Induced Pyrolysis of Plastic Wastes," Industrial & Engineering Chemistry Research, 40(22): 4749-4756 (2001).
Vander Wal, R. L. et al., Optimization of Flame Synthesis for Carbon Nanotube Using Supported Catalyst, *The Journal of Physical Chemistry B*, 106.51: 13122-13132 (2002).
Vander Wal, R. L. et al.,"Single-walled Carbon Nanotube Synthesis via a Multi-stage Flame Configuration," *The Journal of Physical Chemistry B*, 106.14: 3564-3567 (2002).
Written Opinion for Int'l Application No. PCT/US10/28876, titled: Carbon Nanostructures From Pyrolysis of Organic Materials, Date Mailed: May 4, 2010.
Zhuo et al., "Synthesis of Carbon Nanotubes by Sequential Pyrolysis and Combustion of Polyethylene," *Carbon*, 48: 4024-4034 (2010).

* cited by examiner

METHOD AND DEVICE FOR FUEL AND POWER GENERATION BY CLEAN COMBUSTION OF ORGANIC WASTE MATERIAL

This application claims the benefit of the filing date of U.S. Provisional Patent Application No. 61/419,492, filed Dec. 3, 2010, the contents of which is hereby incorporated by reference.

FIELD OF THE INVENTION

The invention is generally directed to methods and systems for the production of fuel and generation of power from solid waste sources. More specifically, the invention is related to the use of organic waste material, such as organic waste including plastics and other municipal waste materials, for the production of fuel.

BACKGROUND OF THE INVENTION

Fossil fuel resources are finite, and are widely expected to dwindle in the not too distant future. As these resources become more scarce, the costs of extracting fuel will increase, as well as the cost of the resource itself due to increased competition and demand. Such costs are likely to put increased pressure on economies worldwide. Thus, fossil fuel utilization presents potential issues to future energy security and financial interests. Alternative fuel resources should be identified to limit reliance on fossil fuels.

In addition, the total amount of municipal solid waste (MSW) generated in the US alone has increased by threefold from 80 million to 250 million tons over the past 50 years. In 2008, 12% of this total was non-biodegradable polymers (plastics). Only 7% of these plastic components are recycled, due to limited markets and limited consumer compliance. Solutions are needed to address the issues of (a) continuously decreasing available landfill space, (b) ubiquitous pollution problems (e.g., the Great Pacific Garbage Patch) and, (c) wasting such an energy dense fossil-fuel-derived resource. Accordingly, it is important to eliminate or reduce the amount of waste that ends up in the environment.

One potential way to eliminate organic waste is to incinerate it. Nonetheless, conventional techniques of burning waste organic waste material tend to be harmful to the environment and health of people. Another potential path to eliminating organic waste is to convert it into fuel. Organic waste has a tremendous amount of stored energy. Direct combustion of waste plastics, for instance, in waste incinerators releases their stored energy, which is on the order of 46,000 kJ/kg, and is comparable to those of the premium fuels of gasoline, diesel oil and natural gas. However, such conventional direct combustion techniques lead to uncontrollable, inefficient energy production that also generates large amounts of health-hazardous soot and hydrocarbons. This is demonstrated in FIG. 2, where combustion of a Styrofoam cup (polystyrene) releases soot and toxic fumes.

Therefore, there is a need for systems and methods for extraction of fuel and/or energy from energy-dense solid organic waste materials, such as waste plastic, without releasing dangerous and unhealthy compounds.

SUMMARY OF THE INVENTION

According to aspects of the present disclosure, methods and systems are disclosed to achieve "clean burning" of solid organic waste materials, such as waste plastics, which are derivatives of fossil fuels. The systems and methods disclosed herein both destroy the wastes and produce either useful fuels or useful thermal energy. The systems and methods take advantage of the benefits of indirect combustion of waste polymers, where organic waste materials are converted to a liquid and/or a gas state prior to combustion (FIG. 1). In particular embodiments, the systems and methods eliminate waste plastics and the generate fuel from these materials. In other embodiments, the systems and methods use a fraction of the generated fuel to supply energy to the process and, thus, self-sustain it.

Aspects disclosed herein include a method of generating power from organic waste materials. The method comprises the method comprises heating the organic waste material to form a liquid and pyrolyzing the liquid to obtain one or more gaseous decomposition products. The method further comprises mixing the one or more gaseous decomposition products with an oxidizing gas to form a mixture and burning and igniting the mixture to produce thermal energy a mixture of the one or more gaseous decomposition products with an oxidizing gas to produce thermal energy. The method also entails generating power by utilizing the thermal energy.

In certain embodiments, pyrolyzing the liquid is performed in an inert atmosphere. In other embodiments, the thermal energy is produced by a pre-mixed fuel-lean flame. In other particular embodiments, the fuel-air equivalence ratio is less than 1. In particular embodiments, a fraction of the heat generated by burning the mixture of the mixture is supplied as process heat to perform liquefying and pyrolyzing processes of the disclosed methods.

In certain embodiments, the solid organic waste material is selected from the group of common post-consumer polymers, polyethylene, polypropylene, and polystyrene. In some embodiments, the organic waste material is selected from the group of common waste biomasses, including woody biomass residues. In particular embodiments, the oxidizing gas is oxygen.

In more particular embodiments, the methods further comprise collecting the one or more gaseous decomposition products in a chamber. In some embodiments, a) through d) are each performed in separate chambers. In certain embodiments, the chambers are positioned in a vertical arrangement. In other embodiments, the chamber for performing a) is positioned above the chamber for performing b), the chamber for performing b) is positioned above the chamber for performing c), and the chamber for performing c) is positioned above the chamber for performing d).

In certain embodiments, the methods further comprise pressurizing the interior of the chamber for performing a) to a pressure higher than atmospheric pressure. In particular embodiments, the chamber for performing a) is pressurized with an inert gas. In more particular embodiments, the pressure in the chamber for performing a) is higher than the pressure in the chamber for performing b), the pressure in the chamber for performing b) is higher than the pressure in the chamber for performing c), and the pressure in the chamber for performing c) is higher than the pressure in the chamber for performing d). In certain embodiments, generating power comprises a turbine or any other heat engine that converts the thermal energy into power.

In some aspects, the methods further comprise mixing the one or more gaseous decomposition products with an oxidizing gas to form the mixture.

Aspects of systems disclosed herein include a system for generating thermal energy from solid organic waste material. The system comprises a liquefaction chamber having a first inlet to receive an organic waste material feedstock, the liquefaction chamber being configured to heat the organic waste material to produce a liquid. The system also comprises a pyrolysis chamber having a second inlet to receive the liquid from the liquefaction chamber and a third inlet to receive an inert gas, the pyrolysis chamber being configured to convert the liquid to one or more gaseous decomposition products and a combustion chamber comprising a sixth inlet to receive the mixture from the mixing chamber and an energy source to ignite the mixture to produce thermal energy. In some aspects, the system comprises a mixing chamber comprising a fourth inlet to receive the one or more gaseous decomposition products from the pyrolysis chamber and a fifth inlet to receive an oxidizing gas to form a mixture.

In certain embodiments, the system further comprises a storage chamber configured to receive and hold the organic waste material, the storage chamber being connected to the liquefaction chamber to provide the organic waste material to the liquefaction chamber. In particular embodiments, the system further comprises a fuel collection chamber having a seventh inlet to receive one or more gasified pyrolyzates from the combustion chamber. In more particular embodiments, the chambers are positioned in a vertical arrangement. In even more particular embodiments, the storage chamber is positioned above the liquefaction chamber, the liquefaction chamber is positioned above the pyrolysis chamber, the pyrolysis chamber is positioned above the mixing chamber, and the mixing chamber is positioned above the combustion chamber.

In certain embodiments, a fraction of the heat generated by the combustion chamber is supplied as process heat to the pyrolysis and liquefaction chambers. In other embodiments, the solid organic waste material feedstock is selected from the group of common post-consumer polymers, including polyethylene, polypropylene, and polystyrene. In still other embodiments, the oxidizing gas is oxygen.

In certain embodiments, the mixing chamber is a venturi. In other embodiments, the mixing chamber mixes the one or more gaseous decomposition products and the oxidizing gas in the absence of the inert gas. In further embodiments, the fifth inlet comprises a valve to control the flow of the oxidizing gas into the mixing chamber. In still further embodiments, the second inlet is sealed to reduce the introduction of atmospheric gases into the pyrolysis chamber.

In certain embodiments, the liquefaction chamber is pressurized to above atmospheric pressure with an inert gas. In other embodiments, the liquefaction chamber has a higher pressure than the pyrolysis chamber and the pyrolysis chamber has a higher pressure than the mixing chamber and the mixing chamber has a higher pressure than the combustion chamber.

In particular embodiments, the fourth and sixth inlets comprise one-way valves to reduce backflow of the oxidizing gas into the pyrolysis chamber. In further embodiments, the thermal energy is provided to a turbine or any other heat engine that converts the thermal energy into power. In still further embodiments, the organic waste material is selected from the group of common waste biomasses, including woody biomass residues. Such residues include waste materials that have been generated by chipping, mulching, and or partial burning. In addition, such residues can include cellulosic fibers. In other embodiments, the organic waste material is selected from the group of common waste biomasses, including woody biomass residues.

Aspects of methods disclosed herein also include a method of generating power from solid organic waste materials. The method comprises pyrolyzing the solid organic waste materials to obtain one or more gaseous decomposition products and mixing the one or more gaseous decomposition products with an oxidizing gas to form a mixture. The method further comprises igniting and burning the mixture to produce thermal energy and utilizing the thermal energy to generate power.

In certain embodiments, the organic waste material is selected from the group of common waste biomasses and woody biomass residues. In other embodiments, the oxidizing gas is oxygen. In still other embodiments, the methods further comprise collecting the one or more gaseous decomposition products in a chamber. In further embodiments, a) through c) are each performed in separate chambers. In still further embodiments, the chambers are positioned in a vertical arrangement. In particular embodiments, the chamber for performing a) is positioned above the chamber for performing b), and the chamber for performing b) is positioned above the chamber for performing c).

In more embodiments, the methods further comprise pressurizing the interior of the chamber for performing a) to a pressure higher than atmospheric pressure. In particular embodiments, the chamber for performing a) is pressurized with an inert gas. In still more particular embodiments, the pressure in the chamber for performing a) is higher than the pressure in the chamber for performing b), and the pressure in the chamber for performing b) is higher than the pressure in the chamber for performing c).

In further embodiments, a fraction of the heat generated by burning the mixture of the decomposition products with oxidizing gases is supplied as process heat to self-sustain the liquefaction and pyrolysis processes. This allows for the systems and methods to be self-sustaining.

DESCRIPTION OF THE FIGURES

The following figures are presented for the purpose of illustration only, and are not intended to be limiting.

DETAILED DESCRIPTION OF THE INVENTION

1. General

According to aspects of the present disclosure, methods of generating power from organic waste material are disclosed. The methods comprise heating solid organic waste material to form a liquid and/or a gaseous fuel. Examples of organic waste materials include plastics such as polyethylene, polypropylene, and polystyrene. In addition, other organic polymers can be used to generate power so long as the organic polymers generate combustible gaseous decomposition products and do not generate uncontrolled explosions. Furthermore, the methods also comprise pyrolyzing the liquid to obtain one or more gaseous decomposition products and combusting a mixture of the one or more gaseous decomposition products with an oxidizing gas to produce thermal energy. In certain embodiments, the methods comprise generating power by utilizing the thermal energy produced during the combustion of the mixture.

Figure 1:
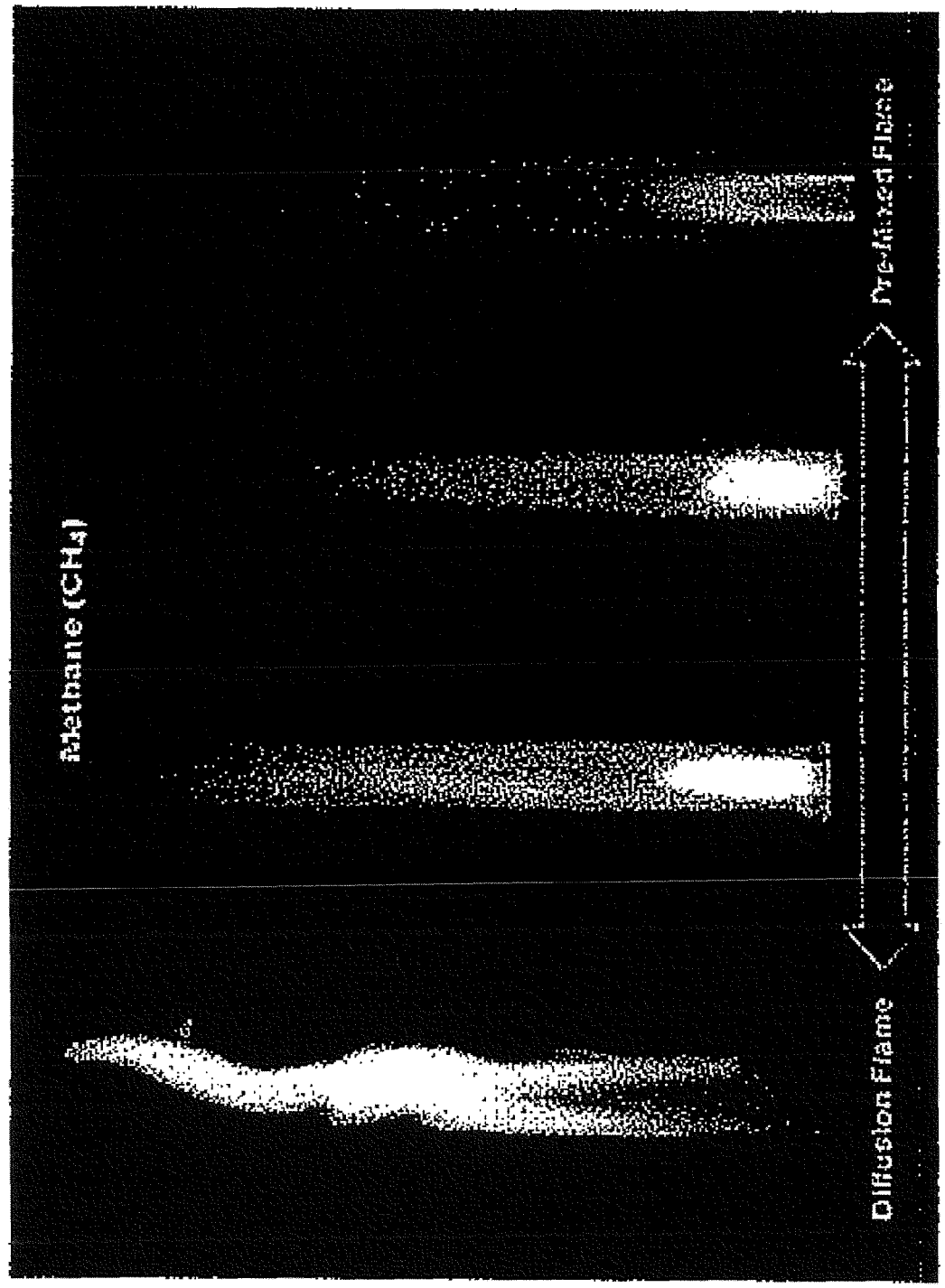
FIG. 1 is an illustration of flames under different combustion conditions: far left showing a sooty diffusion flame combusting solid waste and far right showing a clean flame from pre-mixed gas/liquid material (see world wide web at cfbt-us dot com).
Figure 2:
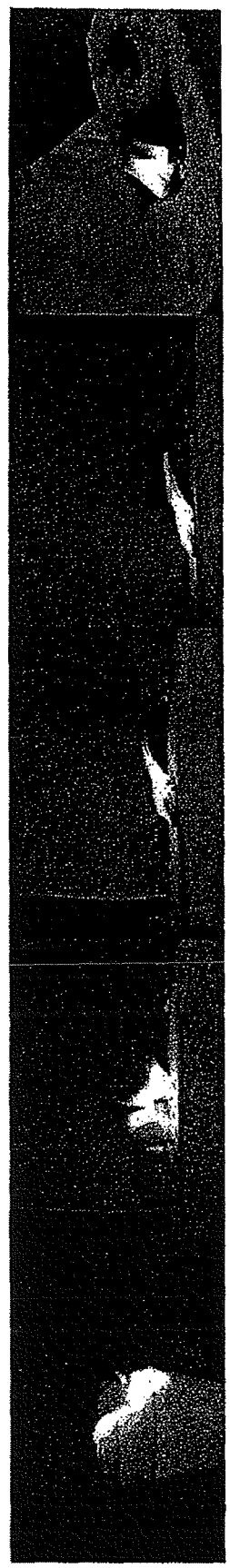
FIG. 2 shows a photographic representation of the direct combustion of a Styrofoam cup with the release of smoke and toxins.
Figure 3:
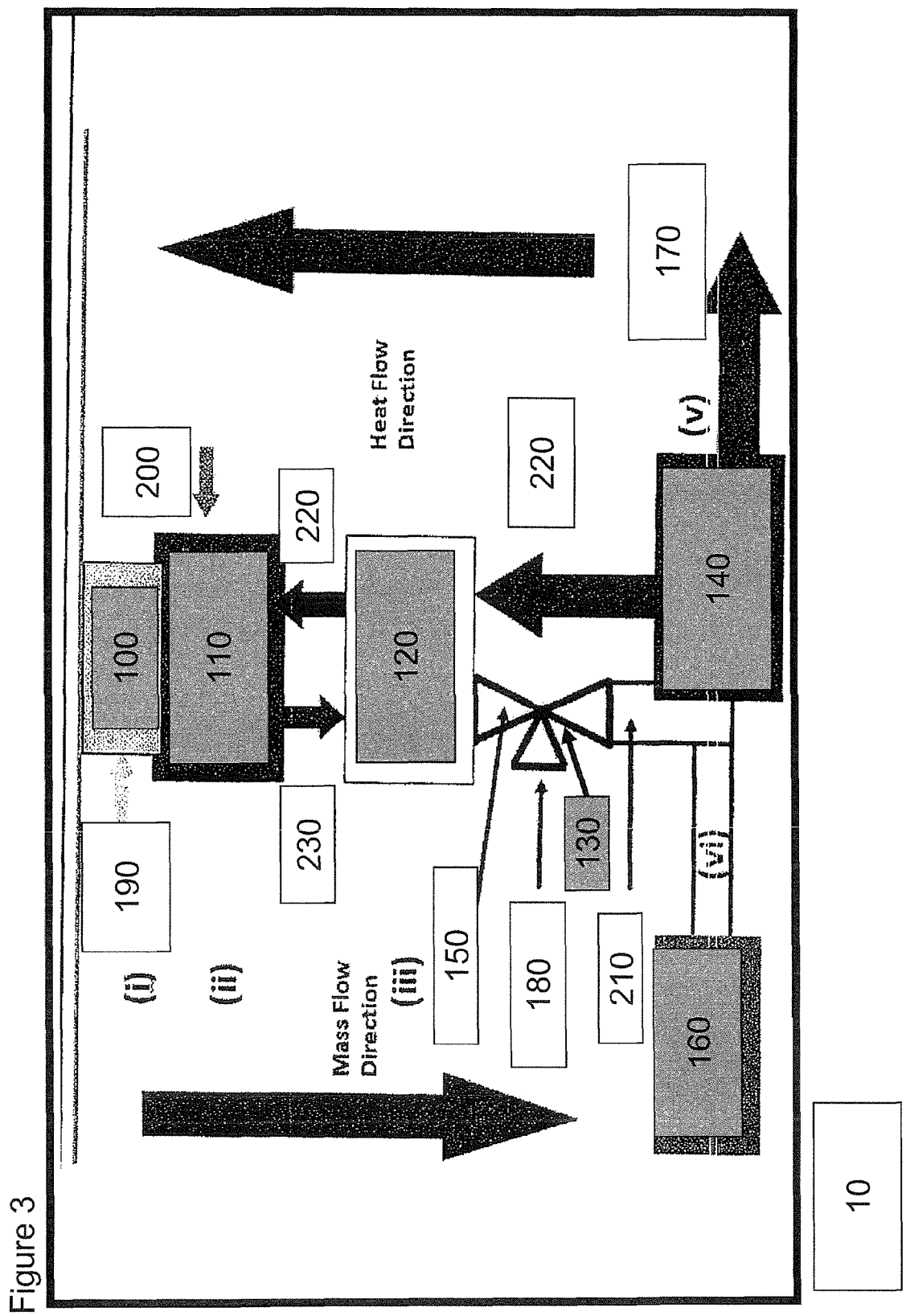
FIG. 3 shows a schematic depiction of a method of generating fuel and thermal energy from organic waste materials.

An embodiment of the methods disclosed herein is shown in FIG. 3. The corresponding device in FIG. 3 consists of: (i) a storage chamber, (ii) a liquification chamber where the solid organic waste materials are turned into a pool of liquid, (iii) a pyrolysis chamber, where liquid fuel is introduced by pressure and or gravity and is then converted to gaseous components, (iv) a mixing chamber where the gaseous pyrolyzates can be thoroughly mixed with oxidizing gases under predetermined proportions, (v) a combustion chamber where such premixed fuel and oxygen (i.e., oxidizing gas) mixtures burn completely in low-emission premixed flames, and/or (vi) a container to collect gasified pyrolyzates for storage and later use.

In FIG. 3, a storage chamber 100 is utilized for receipt and holding of the organic waste material 190 (e.g., waste materials). When organic waste material 190 is placed into the storage chamber, the organic waste material 190 is held in the storage container until it is moved into the liquefaction chamber 110. The organic waste material 190 can be placed into the storage container by any means, including front loaders, cranes, and manual loading.

The storage chamber 100 is connected to the liquefaction chamber 110 (FIG. 3). The connection can be a chute, a hole, or an inlet, all of which can include a door or valve to regulate the influx of new solid organic waste materials. In certain embodiments, upon filling the storage chamber 100 through an opening, which is closed after receipt of organic waste material 190, an inert gas flow 200 is turned on. The inert gas 200 fills the liquefaction chamber 110 and pressurizes the chamber. The gas also displaces the oxygen and other gases in the chamber. In certain embodiments, the oxygen and atmospheric gases are expelled through an outlet that is regulated by a one-way valve. The contents in the storage chamber 100 are allowed to fall into the liquefaction chamber 110 through a butterfly (flip-flop) valve. Such valves are well known in the art. Once the solid organic waste material is in the liquefaction chamber, the organic waste material is heated to its melting point. In the case of mixed organic waste materials, the liquefaction chamber 110 is heated to the highest temperature necessary to liquefy all of the contents in the chamber to form liquefied fuels 230.

The liquefaction chamber 110 liquefies the organic waste materials in an inert gas. The liquefaction chamber 110 should be made of materials that can withstand temperatures of at least 350° C. For example, melting of common commercial grades of medium- and high-density polyethylene commences at temperatures of 130° C., and polymers (such as polyethylene, polypropylene, polystyrene, etc.) can liquefy completely at temperatures in the range of 300-400° C.

In aspects of the methods disclosed herein, the liquefaction chamber 110 then feeds liquid material to the pyrolysis chamber 120 at a controlled rate, as the liquefaction chamber 110 is under regulated pressure. For instance, the liquefaction chamber 110 is at a higher pressure than the pyrolysis chamber 120 so that the liquefied organic waste material is forced into the pyrolysis chamber 120. Thus, a liquid pool of organic waste material is pressurized by nitrogen in a capped chamber that forces the liquid into the pyrolysis chamber 120 because the pyrolysis chamber 120 is pressurized at a lower pressure than the liquefaction chamber 110. In embodiments having a mixing chamber 130, the mixing chamber 130 is maintained at a lower pressure than the pyrolyzing chamber 120. The combustion chamber 140 is maintained at the lowest pressure in the system, near atmospheric pressure. This pressure gradient ensures the flow of organic waste material in the system from the storage chamber to the combustion chamber 140.

In certain embodiments, there is a safety system in place between each chamber in the event of backpressure occurring. The safety system includes alarms and a safety shutoff to close valves, thereby stopping the flow of organic waste material in the system. Such systems are known in the art and are within the scope of the systems disclosed herein.

Returning to the method shown in FIG. 3, the pyrolyzed fuel 150 (gaseous hydrocarbons, i.e., pyrolyzates or alternatively named "gaseous decomposition products") can either be collected in a fuel collector 160 and used as either a gaseous synthesis gas or burned to generate thermal energy (heat) 170 in the combustion chamber 140. In FIG. 3, the gaseous decomposition products 150 are sent through a mixing chamber 130 (i.e., the venturi) to mix the products 150 with oxidizing gas 180 to form a mixture 210 prior to arriving at the combustion chamber 140. In the case, the pyrolyzates 150 are mixed with controlled amounts of an oxidizing gas 180 to form a clean-burning, premixed flame. Such oxidizing gases can be supplied through dedicated inlets that have valves that allow for the control of oxidizing gas into the mixing chamber 130 (i.e., the venturi). In some embodiments, the oxidizing gas can be oxygen. The oxygen can be supplied from commercial sources or from the atmosphere.

In certain embodiments, the flame generated in the combustion chamber 140 is a fuel-lean flame. As used herein, the term "fuel-lean" means a mixture of fuel and oxidizing gas where an excess of oxidizing gas exists as compared to fuel. In some embodiments, the fuel-oxidizing gas equivalence ratio is less than 1.

Additionally, as depicted in FIG. 3, excess energy produced from the combustion chamber 140 is used to heat other chambers in the system. This is process heat 220. FIG. 3 shows that systems practicing the methods disclosed herein can be vertically arranged, "stacked," to allow for rising process heat 220 to heat the upper chambers of the system 10. As used herein, the "process heat" means thermal energy released in a combustion chamber that is internally used by the system. This is typically a small fraction of the total energy released in the combustion chamber 140. In the system, this process heat 220 flows in the opposite direction to mass flow, which is guided by pressure and gravity. This process heat 220 supplies thermal energy to the pyrolysis 120 and the liquefaction chambers 110. Use of insulation surrounding the chambers minimizes heat loss to the environment. In some embodiments, the chambers are all located in a single housing and the insulation covers surfaces on the inside of the housing. In addition, the insulation can be used to insulate pipes and vents moving heated organic waste materials, such as waste plastics, from one chamber to another. Insulation can also be used to insulate pipes or vents used to distribute process heat from the combustion chamber to the other chambers in the system. Exemplary insulation includes calcium silicate insulation, such as Thermo-12® (Industrial Insulation Sales, Inc., Buffalo, N.Y.), perlite insulation, such as Temperlite® 1200° Thermal Insulation (Industrial Insulation Sales, Inc., Buffalo, N.Y.), and asbestos insulation.

The methods disclosed herein can be initialized by providing an energy source. For instance, the energy source can be burning natural gas at the bottom of the system to heat the combustion chamber 140 to get the process started. The heat can also be supplied by an electrical means, such as electrical heat or a spark to ignite fuel heat.

Some of the energy released in the combustion of the organic waste material, for example, waste plastics, can be used to heat the pyrolysis and the liquefaction chambers, while other fractions can be used to preheat the oxidizer gas and the inert gas. This is because a large energy surplus occurs through the combustion process. The heat needed for pyrolysis of polyethylene, for instance, is approximately 254 kJ/kg. Comparing this heat of pyrolysis to the heating value (energy content) of such polymers, which are in the range of 44,000-46,000 kJ/kg, it is evident that only a small fraction of the thermal energy released during combustion needs to be fed-back to pyrolyze the plastics. This leaves a large amount of thermal energy that can be used for other purposes, such as generating steam and electricity.

Regarding electricity, the thermal energy can be provided to a plant for the production of electricity by the use of turbine technology or other heat engine. In some embodiments, the system is part of a power plant. In these embodiments, the system is provided with organic waste materials, for instance, waste materials, using a continuous feeding system that feeds the entire power plant with waste materials to allow for steady state production of thermal energy.

In additional embodiments, the system 10 provides liquefied organic waste material 190 continuously to the pyrolysis chamber 120 from the liquefaction chamber 110 to prevent oxygen or atmospheric gas from entering the pyrolysis chamber 120. The liquefied organic waste material 230 acts to seal the pyrolysis chamber 120 from the liquefaction chamber 110.

The methods disclosed herein can be performed by systems useful for generating thermal energy from organic waste material. The systems can comprise one or more chambers that are interconnected to allow for the conversion of organic waste materials from solid into gaseous fuels at the same time. Those fuels may be burned in heat engines to produce work, or in furnaces to produce heat. Furthermore, the chambers can be composed of heat-resistant materials such as steel, iron, copper, metal alloys, and ceramics.

Systems useful for practicing the methods are disclosed herein. Referring to the schematic in FIG. 3, the system 10 comprises a liquefaction chamber 110 having a first inlet to receive an organic waste material 190. In some embodiments, the liquefaction chamber 110 is configured to heat the organic waste material 190 to produce a liquid 230. In some embodiments, the system 10 comprises a series of vents to capture and provide process heat 220 from the combustion chamber 140 to the liquefaction chamber 110 for the purpose of heating the liquefaction chamber 110. In other embodiments, the liquefaction chamber 110 comprises a heat source to heat the chamber 110.

The system also further comprise a pyrolysis chamber 120 having a second inlet to receive the liquid fuel 230 from the liquefaction chamber 110 and a third inlet to receive an inert gas. The pyrolysis chamber 120, in this embodiment, is configured to convert the liquid 230 to one or more gaseous decomposition products 150. This is accomplished by receiving process heat 220 from the combustion chamber 140 to heat the pyrolysis chamber 120. The pyrolysis chamber gasifies the organic waste materials in an inert gas. The pyrolysis chamber should be made of materials that can withstand temperatures of at least 900° C. For example, polyethylene gasifies nearly-completely at temperatures of 800° C.

In additional aspects, there is a mixing chamber 130 (i.e., venturi) between the pyrolysis chamber 120 and the combustion chamber 140. In certain embodiments, the mixing chamber 130 comprises a fourth inlet to receive a fourth inlet to receive the one or more gaseous decomposition products 150 from the pyrolysis chamber 120. The mixing chamber 130 can be located adjacent to, beneath, or over the combustion chamber 140. The fourth inlet, in such aspects, has a one-way valve to prevent oxidizing gas in the mixing chamber 130 from back flowing into the pyrolysis chamber 140. The mixing chamber 130 also comprises a fifth inlet to receive an oxidizing gas 180 to form a mixture 210 of the gaseous decomposition products 150 and oxidizing gas 180.

The system 10 further comprises a combustion chamber 140 that receives the mixture 210 through a sixth inlet. This inlet can have a one-way valve to prevent back flowing of the mixture 210 to the mixing chamber 130. In certain embodiments, the combustion chamber 140 comprises an energy source to ignite the mixture 210 to produce thermal energy 170. The thermal energy 170 is then vented through pipes or vents to a power plant or other heat engine.

In some embodiments, the systems disclosed herein sustain themselves by emitting heat directionally to supply the pyrolysis and liquefaction chambers with process heat from the combustion chamber. In such embodiments, this is facilitated by directing the gasified organic waste material (i.e., pyrolyzate) to a certain location in the system, while the material is gasified and heated (e.g., 800° C.). Once at the combustion chamber, the gas/oxidizing gas mixture is combusted, which accommodates heating of the pyrolysis and liquefaction chambers. In certain embodiments, the pyrolyzate is provided by a pipe from the pyrolysis chamber to the combustion chamber. The pipe carries the pyrolyzate (i.e., pyrolyzed gas) directly to the combustion chamber in one stream. In certain embodiments, the gas would be introduced to oxygen at the combustion chamber. This allows for a very direct route to the combustion chamber.

In other embodiments, a splitter is provided at the end of the pipe from the pyrolysis chamber to the combustion chamber, to divide the fuels into portions for a) power generation, and b) process heat generation for self-sustaining of the process.

In certain aspects of the systems disclosed, there is no mixing chamber. In these embodiments, the combustion chamber comprises an additional inlet to allow oxidizing gas to enter the combustion chamber. The combustion chamber, thus, receives the oxidizing gas and the gaseous decomposition products to form the mixture.

Embodiments of the system include a compression chamber. The compression chamber is situated on top of the liquefaction chamber and acts partially as a cap. The chamber is pressurized by pumps with inert gas and has the highest pressure of all of the chambers in the system. In these embodiments, pressure drives the flow of the plastic into the pyrolysis chamber in a continuous manner.

Figure 4:
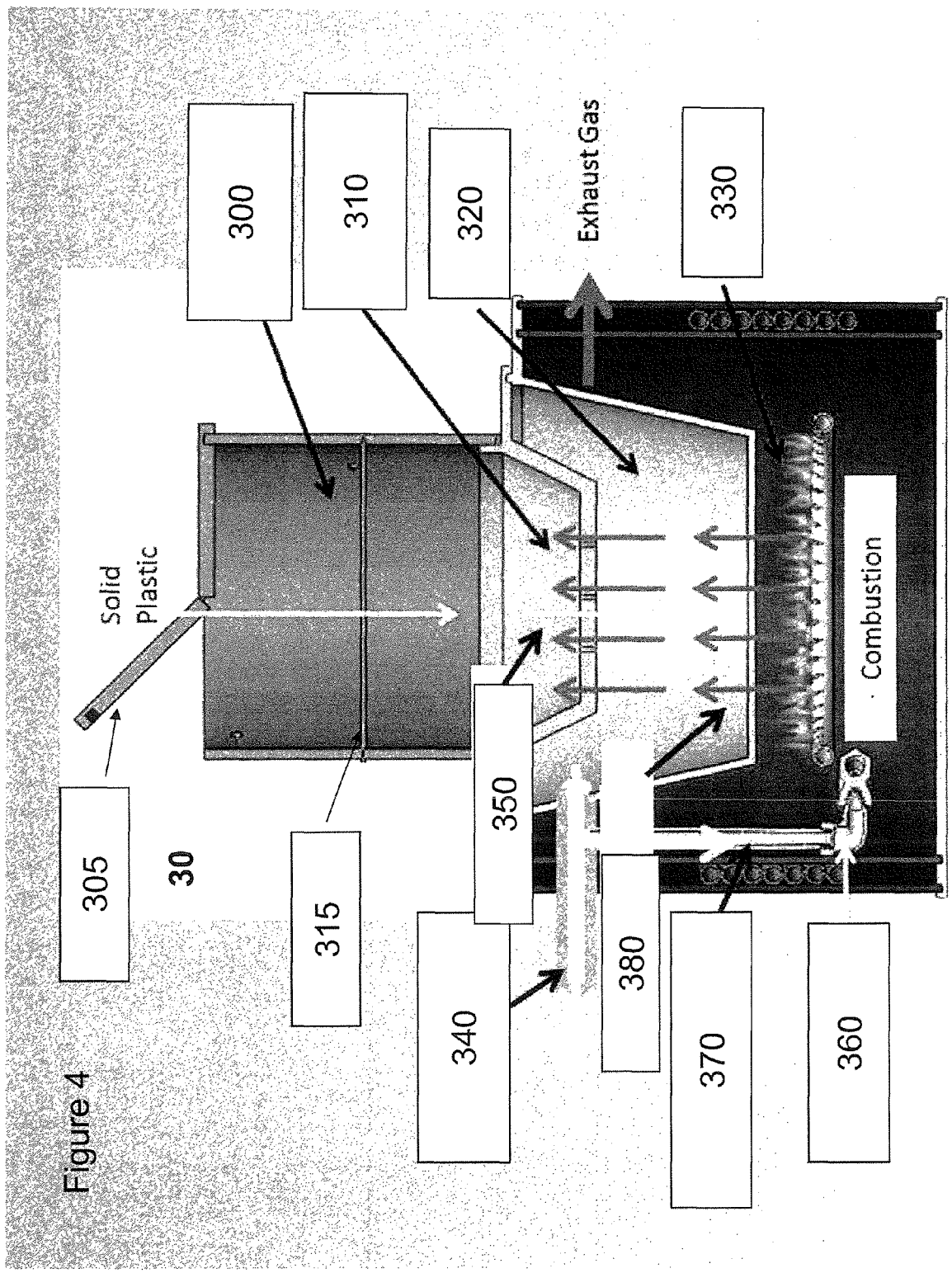
FIG. 4 is a schematic of a system comprising a compression chamber, a liquefaction chamber, a pyrolysis chamber, and a combustion chamber organized in vertical arrangement.

FIG. 4 discloses an example of a system 30 further comprising a compression chamber 300. The compression chamber 300 includes a removable air-tight cap 305 and a pressure gate 310. The compression system 300 in FIG. 4 is a subsystem that attaches to the top of the liquefaction chamber 310. The top of the compression chamber 300 has an air tight removable cap 305 that one can remove to insert solid plastic that will then enter the system 30. The cap 305 is resealed, and the initial chamber is pressurized to the same pressure as the liquefaction chamber 310. The chamber 300 is to be pressurized with an inert gas (for example, nitrogen) to rid the chamber of oxygen. The pressure gate 315 can be a butterfly gate, single trap door, or double trap doors. The single trap door gate would be hinged at one side and rotate 90°. The double trap door can consist of two gates, hinged at opposite sides that rotate 90°. Using a butterfly gate once the initial chamber is pressurized, the pressure gate 315 (shown in FIG. 4) floor of the chamber rotates on the center axis and all of the waste plastic is poured into the liquefaction pool below. The floor of the compression chamber 300 flips and drops all material into liquefaction chamber to melt and to feed continuously the system with organic waste material. The compression chamber 300 can maintain the set pressures to keep the system running, and to safely prevent back pressure.

Once solid organic waster, such as plastic enters the compression chamber 300, the cap 305 is sealed and the compression chamber 300 is pressurized. The waste drops through the pressure gate 315 and proceeds to the liquefaction chamber 310. The liquefaction chamber 310 receives process heat generated by the combustion chamber 330. The liquefied organic material 350 descends to the pyrolysis chamber 320 for conversion into gaseous decomposition products 380. The products 380 escape (yellow arrows) through a pipe or vent to the combustion chamber 330. Prior to reaching the combustion chamber 330, the products 380 are mixed with oxidizing gases either at the combustion chamber 330 or in a mixing chamber 360. The mixture then reaches the combustion chamber 330, where it is ignited and burned to produce thermal energy. Some of this energy is process heat that is used to heat the pyrolysis 320 and liquefaction 310 chambers. The rest of the thermal energy is used to generate power. In certain embodiments, some of the gaseous decomposition products generated in the pyrolysis chamber 320 are diverted to a fuel chamber 340 for storage to await use in other processes.

Figure 5:
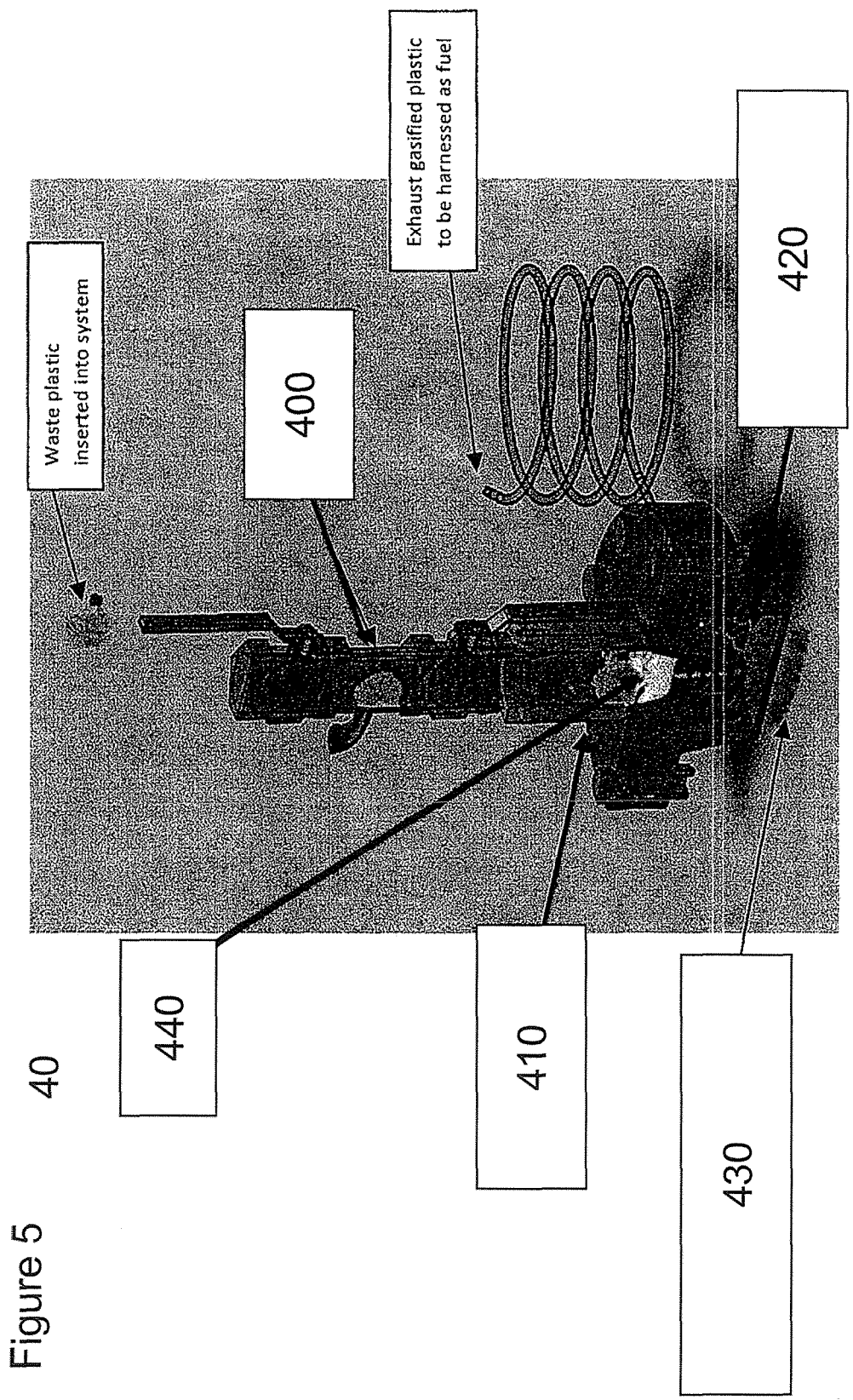
FIG. 5 is a schematic of an embodiment of the disclosed systems.

FIG. 5 shows a specific embodiment of the systems disclosed herein. In the embodiment shown, the compression 400, liquefaction 410, and pyrolysis chambers 420 are stacked. In this specific embodiment, insulation is provided to capture as much heat as possible within the system 40. The heat is directed in a controlled manner from the hottest chamber (combustion 430) at the bottom to the coolest chamber (compression 400) at the top. As shown in FIG. 5, each chamber is directly connected to the next in series, and the direction of flow is as follows:
Compression chamber→Liquefaction chamber→Pyrolysis chamber→Combustion chamber In this embodiment, the pressure gradient is the opposite of the heat gradient, with the highest pressure occurring in the compression chamber 400 and the lowest pressure occurring in the combustion chamber 430 (see also FIG. 3). Another reason for the stacking shown in FIG. 5 is to transfer the heat created from the combustion chamber to the pyrolysis chamber 420 and then into the liquefaction chamber 410. The excess heat naturally rises to the pyrolysis chamber 420 and keeps the plastic in liquefied form 440 and flowing. This creates a sustainable heating method to keep the system going.

In this specific embodiment, external pumps keep the chambers at specific pressures, and one way valves between the pyrolysis and combustion chamber keep oxygen in the combustion chamber from reaching the pyrolysis chamber. The one-way valves can be ceramic or metal (see, e.g., U.S. Pat. Nos. 4,930,535 and 4,795,340). Because the combustion chamber heats the pyrolysis chamber and in turn heats the liquefaction chamber, a continuous flow in the system is desired to keep the combustion chamber active in producing heat. Therefore, in this embodiment, the top chamber inserts the solid organic waste material into the system to maintain a constant flow fuel.

2. Calculations

The following calculations allow for easy identification of the parameters for the disclosed systems.

2.1. Compression Chamber

The cylindrical outside walls of the liquefaction chamber and pressure chamber were modeled as a rectangular fin with a uniform temperature surrounding with free convection occurring. The temperature at the top of the fin was calculated using equation 1. The equation is dependent on the convection coefficient (h), the length of the fin (L), the contact area ($A_c$), and the thermal conductivity (k), and $\theta_b$ is the difference in temperature from the base and the temperature of the air.

$$(T-T_\downarrow\infty)/(T_\downarrow b-T_\downarrow\infty)=((\cos\ m(L-x)+(h/mk)\sin\ m(L-x))/(\cos\ hmL+(h/mk)\sin\ hmL) \quad \text{Equation 1.}$$

2.2. Pyrolysis Chamber

The temperature of the heated pyrolysis chamber was calculated using the equivalent circuit method (Equation 2). The heat transfer by conduction from the combustion chamber as well as the convection from the pyrolyzed plastic was taken into account to calculate the temperature throughout the pyrolysis chamber.

$$q \longrightarrow \qquad (2)$$

$$T_1 \quad\quad T_2 \quad\quad T_3$$

$$\circ\!-\!\!\!\bigvee\!\!\bigvee\!\!\bigvee\!\!-\!\circ\!-\!\!\!\bigvee\!\!\bigvee\!\!\bigvee\!\!-\!\circ$$

$$\frac{t}{kA_p} \qquad \frac{1}{h_1 A_p}$$

2.3 Combustion Chamber

The following calculations can be used to determine the overall energy output of the combustion chamber. The temperature of the combustion chamber cannot explicitly be used. In this case, the calculations are based on the energy found in experimental chambers and theoretical calculations based on the energy of combustion of plastic, which is 44 MJ/kg. The basic equations were used as follows where Q is the thermal energy rate:

$$\dot{Q}_{output}=\dot{Q}_{pyrolized\ gas}+\dot{Q}_{air}+\dot{Q}_{combustion} \quad (3)$$

The balanced chemical equation for the complete combustion of HDPE, which is used to find the number of moles of each element, was found to be the following. This is needed to determine the amount of nitrogen and enriched air needed in the system to ensure the complete combustion of HDPE.

$$C_2H_2+3(O_2+3.76N_2)\rightarrow 2CO_2+2H_2O+11.28N_2 \quad (4)$$

A flexible mathematical model was created using the equations above to calculate the output energy of the system as well as temperatures throughout it depending on the dimensional input of each chamber.

3. Experimental 3.1. Stage 1

Figure 6:
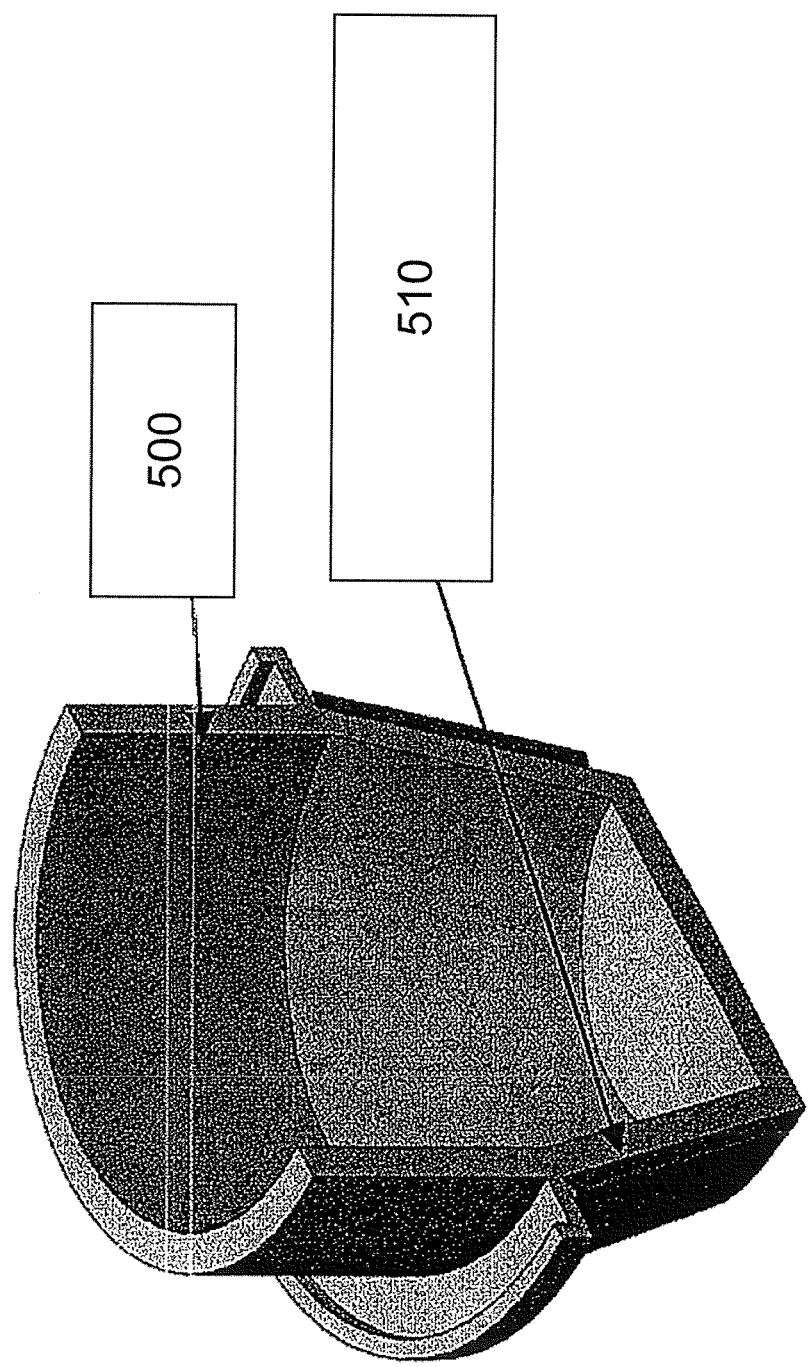
FIG. 6 is a schematic of a crucible, which acted as a model liquefaction chamber, used during plastic melting experiments.

To test the concepts presented herein, a smaller version of the liquefaction chamber, resembling a crucible, was constructed (FIG. 6). This crucible 500 was machined out of spare steel in the machine shop and an electric heating system 510 was wrapped around it to provide sufficient heating. It was estimated that temperatures ranging from 115-150° C. would be needed to liquefy plastic.

The objectives of Stage I were to observe whether or not plastic materials melt in the crucible 500 evenly, eventually completely liquefying, and when it did liquefy, to determine what temperature was needed to do so. To determine if it was necessary to purge the liquefaction chamber and to determine if liquefied plastic reacts with the oxygen in ambient air or if nitrogen was necessary, the experiment took place in ambient air in a fume hood to see if smoking or gasifying occurred. Also, a watt-meter was used to determine the energy needed to melt the plastic.

3.1.1. Equipment
  Steel crucible
  Electric heat wrap and insulation
  Watt meter
  Temperature probe and DAC
  Mass balance
  Wall outlets/power strip
  Stop watch
  Digital camera
  Plastic pellets and/or powder and/or plastic waste pieces 3.1.2. Experiment 1—Testing of Heat Wrap and Crucible of Melting Plastic 3.1.2.1. Procedure and Results The purpose of this test was to see if any of the three different types of plastic that are being tested (polyethylene, polypropylene, and polystyrene) will liquefy and if so, at what temperature they will do so. This test was done using a steel plate found in the Combustion Laboratory in the Snell Engineering building at Northeastern University, This plate was suspended over a Bunsen burner using a stand. The temperature probe was placed on the top of the plate to obtain an average temperature of the steel plate. Once the stop watch was started, polyethylene pellets were added to the top of the steel plate. All three types of plastic pellets were observed to determine melting effectiveness and which plastics can be easily used in project development.

Although polyethylene was the first plastic to be added to the plate, these pellets melted and combined, but never liquefied over the duration of the experiment. The second type of plastic added was the polystyrene pellets which are the least stable of the three kinds of plastics. This plastic liquefied completely and quickly, as well as releasing high amounts of pyrolysis gases when the plate was around 250° C. Polypropylene was added next and was found to melt easily as well and to liquefy completely.

3.1.2.2. Analysis

Polystyrene is the easiest to liquefy, although is the most unstable and masks were needed during the experiment. It will be the plastic that will be used for the rest of the experiments as this is the easiest to liquefy. Polypropylene was determined the second easiest to melt, and polyethylene the hardest to melt. Polyethylene is the most stable and does not require wearing masks during experiments.

3.1.2.3. Conclusion

This experiment was a success, as it was determined possible to liquefy plastic. It was determined that high power output was required to liquefy the plastic in a faster time period so as to minimize the reaction with the atmospheric air and to minimize burning. Another hypothesis that was gathered from this experiment was the possibility of needing to preheat the crucible before the plastic is added.

3.1.3. Experiment 2—Testing of Crucible Melting of Plastic 3.1.3.1. Procedure and Results In this test, the Bunsen burner was used to pre-heat the crucible 500 which was then placed into the same configuration as Experiment 1. Smaller amounts of the three plastic types were used; approximately two grams of each plastic. The reasoning for the smaller amount of plastic was to observe what changes are taking place close to the bottom of the crucible 500. The temperature probe was placed in the center of the crucible again, on top of the plastic. The initial temperature of the crucible 500 was taken to be 63° C.

First, polyethylene pellets were added to the crucible. At 26 minutes, the polyethylene started to stabilize its temperature at 197° C. and no liquefying had taken place. After 35 minutes in the crucible, the polyethylene was taken out and was observed to have the same clay-like consistency seen in previous trials. At 37 minutes with the crucible at 211° C., polypropylene was added. After 3 minutes, at 212° C., the polypropylene started to melt and after 5 minutes, had a gelatin-like consistency. Pyrolysis gases were observed coming from the plastic. After 18 minutes in the crucible, the plastic had stabilized and did not liquefy. It was then taken out of the crucible. The crucible was heated for 1 hour, 3 minutes and at 165° C., polystyrene was added. After only 3.5 minutes, the polystyrene was melting, although lots of gas was produced. At the end of the test, polystyrene was observed be the most viscous in comparison to the other plastics, but not enough to flow to another chamber, even at a maximum temperature of 230° C.

3.1.3.2. Analysis

Even though all three types of plastic were tested during the experiment, the plastics did not liquefy or did not liquefy enough in order to flow through by gravity into the pyrolysis chamber. Each plastic melts at different temperatures and changes to a sticky consistency. Polypropylene and polystyrene melted enough to lose the shape of the pellets, although differences between the plastics could be seen separately within the melted mixture.

3.1.3.3. Conclusion

This experiment disproves the hypothesis that the crucible only needed to be pre-heated and with the same 60-Watt heat wrap, be capable of melting plastic. There is also the possibility that once the chamber has been pressurized, the liquefaction process will become more successful and is still to be determined in Stage 2 of testing.

3.1.4. Experiment 3—Testing of Crucible of Melting Plastic 3.1.4.1. Procedure and Results For this experiment, a heater with a higher temperature capacity and a power output of 290 Watts was used. Pyrex glass containers were used for their ability to conduct heat easily and their ability to withstand the necessary temperatures for the test. About 1 gram of each type of plastic was used for this test, although more was added after the fact to determine what would happen if a liquid pool was formed. The test was started when the Pyrex glass reached a temperature of 245° C. and the polyethylene pellets were added.

At 1 minute, it was observed that the pellets had absorbed a significant amount of heat and the temperature had dropped to 195° C. After 2.5 minutes, the pellets were already getting soft and after 7 minutes, were completely transparent with a honey-like consistency. At 9 minutes, the pellets stabilize and start to brown. Next, the polypropylene pellets were added onto top of the polyethylene. After 3.5 minutes the pellets became completely transparent and after 6.5 minutes, they were starting to melt. After 9 minutes, the polypropylene had completely liquefied.

In addition, polyethylene powder was added on top of the liquid. It was observed that in 1 minute, the polyethylene powder would completely liquefy. After this, polypropylene and polystyrene powders were added, all with similar results.

3.1.4.2. Analysis

Even using the high power heater, the polyethylene pellets did not melt causing powders to be tried with a successful result. All three different types of plastic in powder form melted quickly and formed uniformly liquefied pools. Also, the polypropylene and polystyrene pellets liquefied as well.

3.1.4.3. Conclusion

This experiment resulted in the successful production of liquid pools that can flow from chamber to chamber. Also, these pools will be able to create a seal necessary to keep the oxygen out of the pyrolysis chamber.

3.1.5. Experiment 4—Individual Tests for 3 Plastic Types 3.1.5.1. Procedure and Results The goal of the experiment was to observe the changes that occurred when each of the three different types were liquefied individually. The same Pyrex containers were used and the same high power heater. The Pyrex containers were heated to 266° C. before the plastic powders were added. The power output from the heater was read to be 292 Watts.

Polystyrene was the first powder that was added. During the experiment, the powder was added multiple times with the intention of creating a pool of plastic. After 9 minutes, the polystyrene was completely liquid, although remained viscous due to the agglomeration of the powder and needed more heat to melt it. Once the plastic stabilized after 18 minutes, the Pyrex was removed and a new container was used with polypropylene. This procedure was repeated with the other two plastic powder types. In each case, the powders liquefy in less than 1 minute and then more powder was added onto the liquid pool.

3.1.5.2. Analysis

For each type of plastic powder, when more is added, the temperature drops significantly, demonstrating how the powders absorb the heat. In the case of polyethylene, the largest liquid pool was able to be created due to the least amount of agglomeration among the powder and the liquid plastic. Also, after a period of time, the volume in the container decreases due to pyrolysis reactions happening within the container.

3.1.5.3. Conclusion

This experiment has successfully reproduced liquefied pools of plastic of all three different types.

3.1. Overall Conclusion

Through the melting of the plastics and adapting the test plans it had been determined after all six tests, plastic powder or plastic waste pieces with a large surface area can be melted. The ease of melting and liquefying of plastic in these forms is proportional to the amount of power being applied to the scaled down device and a relatively large amount of surface area.

Figure 7:
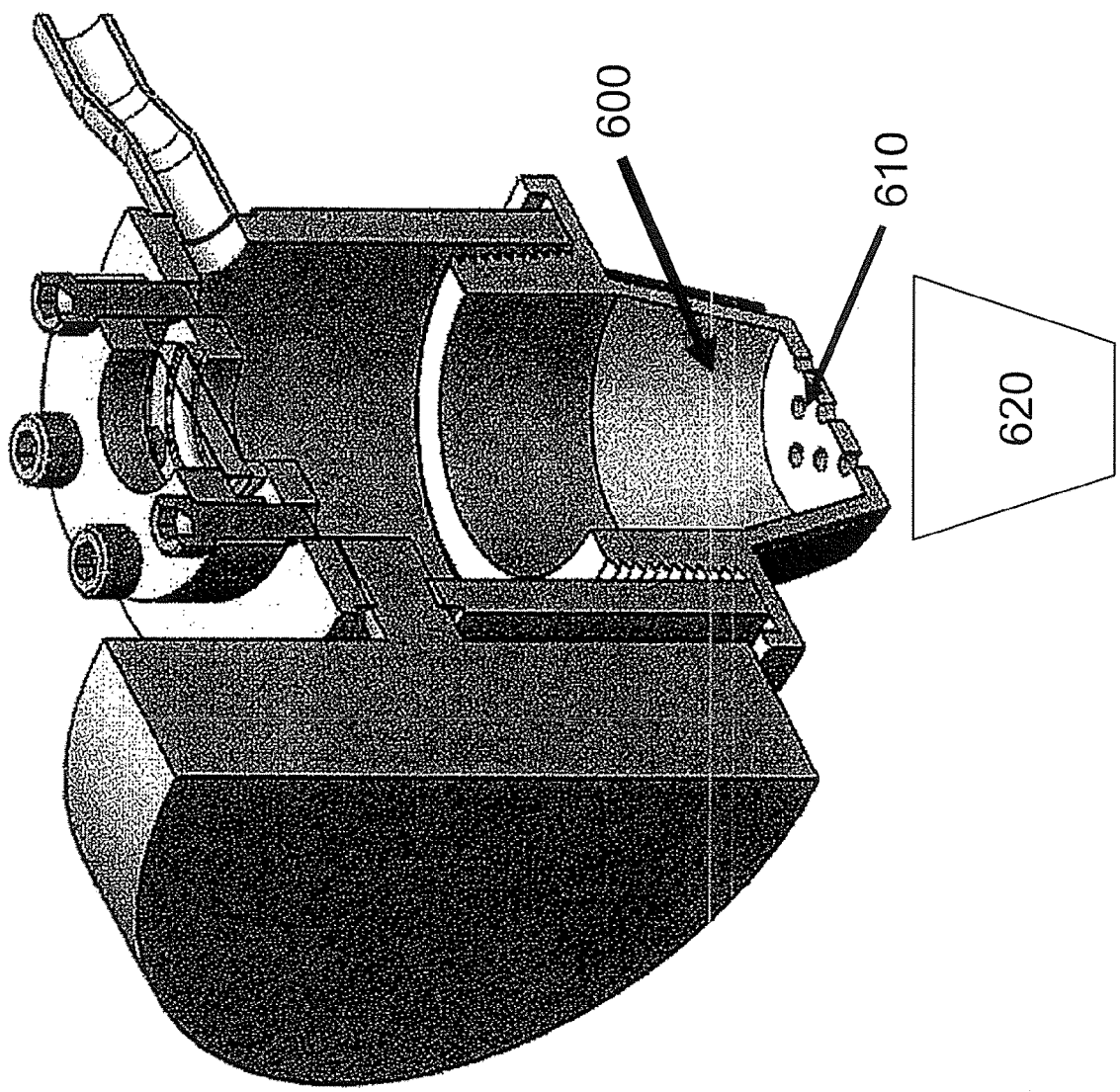
FIG. 7 is a schematic of a crucible containing holes to allow release of melted plastic for the crucible.

3.2. Stage 2—Determining the Mass Flow Rate of Plastic Leaving Liquefaction Chamber 3.2.1. Purpose In the second stage of testing, small holes 610 were drilled into the crucible 600 used in Stage 1 (FIG. 7). The objectives of stage 2 were to determine the mass flow rate of liquefied commercial HDPE, medium density polyethylene powder, low density polyethylene powder, and polypropylene powder. To do this, the crucible 600 was situated in a fixture and the liquid was allowed to flow into a catch 620. The catch 620 was changed about every minute and the mass of the plastic will be measured.

3.2.2. Equipment

Steel liquefaction chamber
Aluminum extension
Liquefaction chamber cover with tempered glass
180 Watt heat wrap
2 psi release valve
Copper tubing
Thermocouple and DAC
Stop watch
Camera
¼" square pieces of a 1 gallon water container made of HDPE
Polypropylene powder (300 μm)
Aldrich polyethylene powder, medium density (125-212 μm)
Polyethylene powder (300 μm)
Aldrich polyethylene powder, low density (300 μm), catalog number 18189-7
Balance
2 silicon 0 rings
Unifrax fiberfrax paper (PS-3351)
Teflon tape
Flow hood
Pressure Gauge 3.2.3. Experiment 1—Flow Rate of Melted HDPE (Water Jug)

3.2.3.1. Procedure and Results

The steel liquefaction chamber was attached to the aluminum extension cylinder using 6 screws with a silicon O-ring between the two parts. A 2 psi brass release valve was threaded into the aluminum cylinder keeping the liquefaction chamber at a maximum pressure of 2 psi. The liquefaction chamber was clamped into place on the metal stand. The heat wrap was placed around the outer wall of the liquefaction chamber. The thermocouple was placed inside the liquefaction chamber. The mass of 5 Styrofoam cups were measured and placed under the chamber to collect the liquefied plastic. Once the chamber reached an average of 250° C., four grams of plastic was added to the liquefaction chamber. When the plastic became transparent, an aluminum cover with a tempered glass window was screwed onto the top of the cylinder with a silicon O-ring inserted between the aluminum extension and cover. A nitrogen line was then hooked up to a long copper line which was connected to the liquefaction chamber. A flow rate of 0.6 liters/min of nitrogen was added to the liquefaction chamber to create pressure to push the plastic through the bottom holes.

The plastic in contact with the walls of the liquefaction chamber began to become transparent within one minute, while the plastic in the center of the chamber took about 15 minutes to melt. After 18 minutes, the cover was screwed onto the liquefaction chamber. The chamber was pressurized after 18 minutes by adding a flow of nitrogen.

The mass of plastic could not be measured every minute because it did not liquefy and instead it extruded out of the bottom holes of the liquefaction chamber. The extruded plastic started to solidify due to the convection from the flow of room temperature air under the flowhood.

About 0.9 grams of plastic was extruded from the liquefaction chamber in 16.5 minutes. The remaining 3.1 grams of plastic was stuck inside the chamber. Because the plastic did not liquefy and flow out of the liquefaction chamber, the mass could not be measured every minute.

3.2.3.2. Analysis

The plastic did not liquefy, it extruded through the holes of the liquefaction chamber continuously. The plastic kept the pressure seal between the liquefaction chamber and the outside air, preventing oxygen from entering the liquefaction chamber.

3.2.3.3. Conclusion

A temperature above 250° C. is needed to liquefy the plastic pieces of water jug made of HDPE.

3.2.4. Experiment 2—Flow Rate of Lab Grade Medium Density Polyethylene Powder 3.2.4.1. Procedure and Results The same procedure was used in experiment 1, except 22.71 grams of lab grade medium density polyethylene powder (125-212 μm) was used to feed the system. The set up was the same as experiment 1 but fiberfrax paper was used as insulation around the bottom of the liquefaction chamber and around the cylinder aluminum extension.

The powder fully liquefied and became transparent within ten seconds. It began to flow continuously without being pressurized. The time was then recorded as soon as the plastic began to flow and the plastic was collected by a glass lens. The lens was switched out with another lens every minute. The mass of the plastic that flowed out of the liquefaction chamber every minute was measured using a scale. The liquid seal was broken around 5 minutes. This was observed from the sound of air releasing from the liquefaction chamber.

3.2.4.2. Analysis

Lab grade polyethylene powder melts completely at 250° C. It did not need to be pressurized to have a constant flow rate. The average flow rate was calculated to be 4.83 grams/min. This average does not include the flow rate from 4.67 to 6 minutes because the liquid seal was broken during that time.

3.2.4.3. Conclusion

The viscosity of the powder polyethylene cannot be controlled by pressure effectively in the designed system since it flows very fast without pressure.

3.2.5. Experiment 3—Flow Rate of Lab Grade Polypropylene Powder 3.2.5.1. Procedure and Results The same procedure was carried out as in Experiment 2, except 25 grams of lab grade polypropylene plastic at a size of 300 μm was fed into the system. The plastic did not fully liquefy and did not flow out of the liquefaction chamber at atmospheric pressure. The polypropylene was extruded through the bottom of the liquefaction chamber, and about ¾ of the 25 grams plastic was extruded out of the chamber in 15 minutes. The remaining plastic was stuck inside the liquefaction chamber. The extrusions were very elastic and the plastic in contact with the bottom of the liquefaction chamber was burned. The temperature of the walls of the liquefaction chamber was an average of 300° C. This value was measured with a thermocouple before the plastic was added to the system.

3.2.5.2. Analysis

Polypropylene powder does not liquefy at 250° C. but instead becomes a highly elastic extrusion. It also burns at temperatures around 300° C.

3.2.5.3. Conclusion

Polypropylene powder may need to be exposed to higher temperatures to fully liquefy.

3.2.6. Experiment 4—Flow Rate of Low Density Polyethylene 3.2.6.1. Procedure and Results The same procedure was used as in Experiment 2, but 20.5 grams of low density polyethylene powder with a maximum diameter of 300 μm was used. The plastic in contact with the walls of the liquefaction chamber became transparent first within about 1 minute. All of the plastic became transparent about 3 minutes after it was poured into the liquefaction chamber. The plastic did not flow out of the liquefaction chamber when pressure was not applied to the chamber by a flow' of nitrogen. The maximum pressure applied was 2 psi. The mass flow rate could not be measured because the plastic did not liquefy and fall into the catch.

3.2.6.2. Analysis

Low density polyethylene did not fully liquefy at 250° C. and instead extruded from the liquefaction chamber. The plastic was highly elastic, and burned when in contact with the inner walls of the crucible for an amount of time, and there were also many bubbles in the extruded plastic. The walls of the crucible were found to be around 300° C. using a thermocouple.

3.2.6.3. Conclusion

Low density polyethylene needs to be exposed at higher temperatures then 250° C. to liquefy, but burns at temperatures around 300° C.

3.2. Overall Conclusion

The results from the experiments in this stage shows that a pressure of 2 psi can be used to create a continuous flow rate of plastic exiting the liquefaction chamber. This shows that the continuous feeding system is feasible and stage three testing can be carried out. Powder polyethylene will be used for testing in stages 3 and 4 for proof of concept of the design because it successfully liquefied, flowed continuously, and it did not burn.

Figure 8:
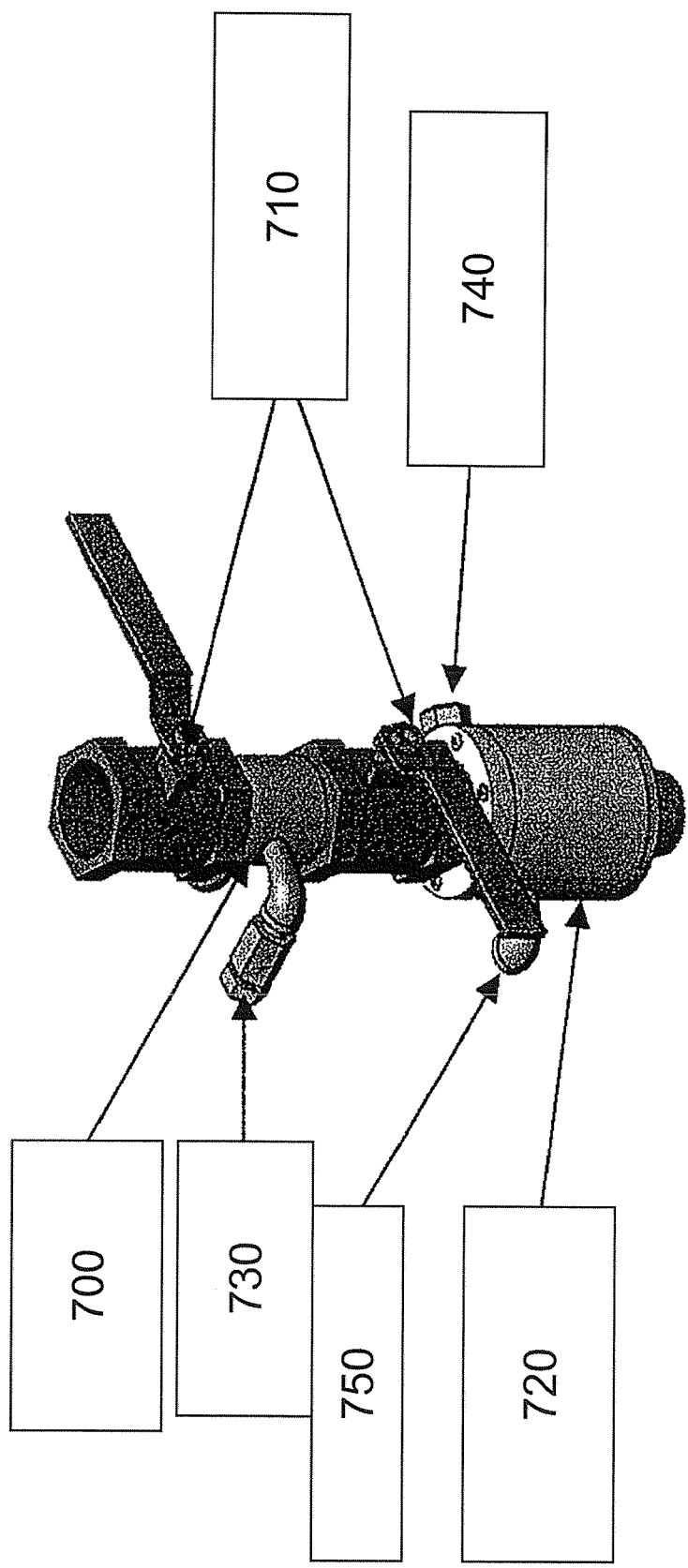
FIG. 8 is a schematic showing a test system comprising a compression chamber and a liquefaction chamber.

3.3. Stage 3—Determining Mass Flow Rate Using Compression Chamber 3.3.1. Purpose The purpose of Stage 3 testing was to determine the flow rate of polyethylene powder using the continuous feeding system 70 consisting of a compression chamber 700 and two butterfly valves 710 (FIG. 8). This was done by using the continuous feeding system 70 which was connected to the liquefaction chamber 720 used in stage 2. In addition, the system 70 had a first nitrogen inlet 730 to allow inert gas into the compression chamber 700. The system 70 also has a second nitrogen inlet 740 to allow inert gas into the liquefaction chamber 720. The system 70 also comprised a release valve 750. Polyethylene powder was added to the system 70 and the mass of liquefied plastic was measured every minute. Polyethylene plastic was added to the compression chamber every 3 minutes, pressurized and then added to the liquefaction chamber.

Figure 9:
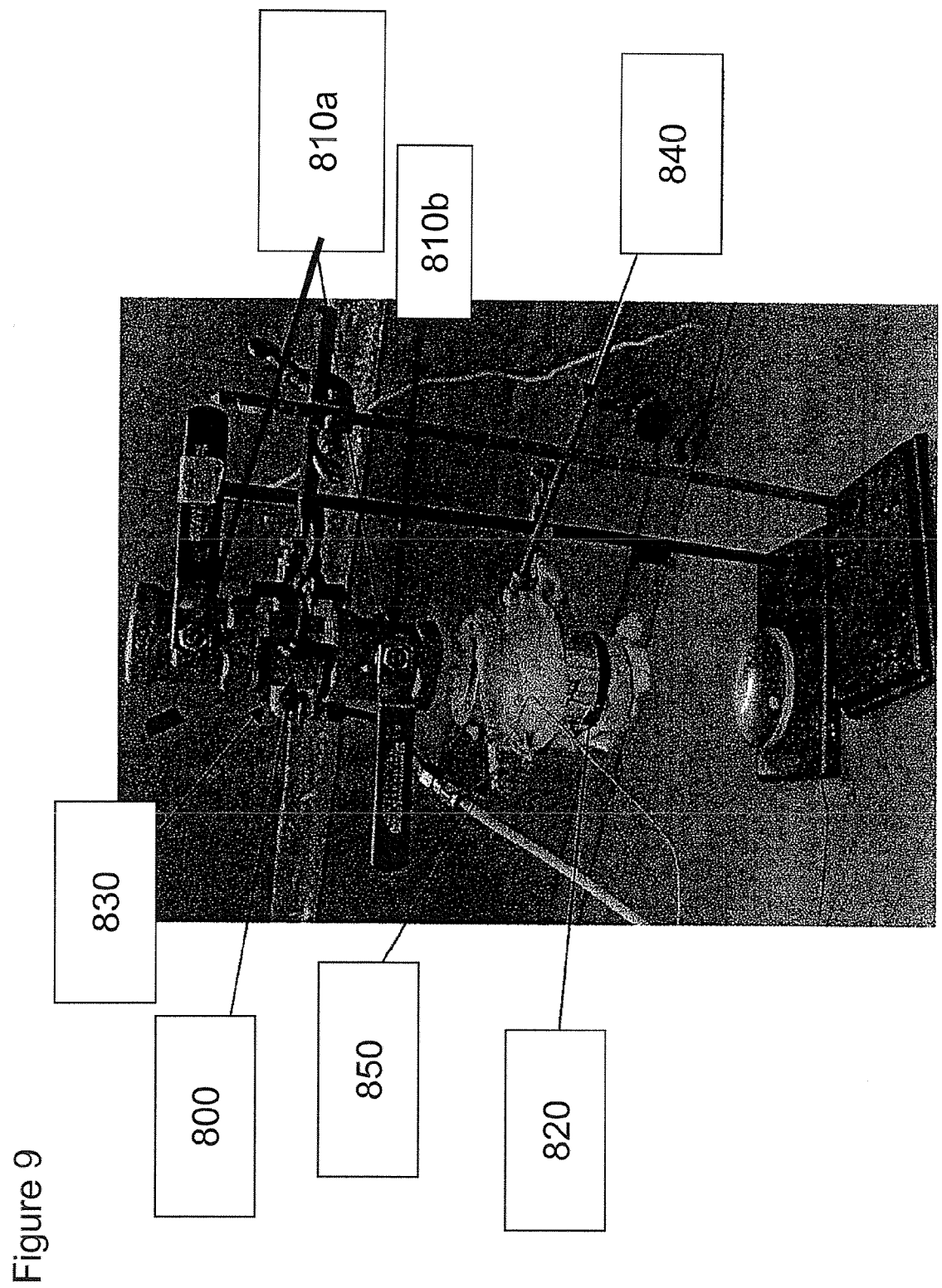
FIG. 9 is a picture of an experimental system comprising a compression chamber and a liquefaction chamber having 8 of 9 holes blocked.

3.3.2. Equipment
  8 plugs (8 screws and bolts)
  2 butterfly valves
  Compression chamber
3.3.3. Experiment—Test Run Using Compression Chamber
3.3.3.1. Procedure and Results As shown in FIG. 9, the liquefaction chamber 820 was attached to the cylinder aluminum extension. Screws and bolts were used to plug 8 out of the 9 holes (not shown) in the liquefaction chamber 820 to decrease the flow rate of plastic. A brass butterfly valve (not shown) was attached to the aluminum extension using a double sided male threaded extension (not shown). Another double threaded aluminum extension (not shown) was used as the compression chamber 800 and attached to two brass butterfly valves 810a and 810b. The system 80 also included a first nitrogen inlet 830 attached to the compression chamber 830 and a second nitrogen inlet 840 attached to the liquefaction chamber 820.

When the system 80 reached 200° C., 18.5 grams of polyethylene plastic powder (the size is ~300 μm) was poured into the compression chamber 800. The top butterfly valve 810a was then shut, and the chamber 800 pressurized with nitrogen through the inlet 830. Subsequently, the bottom butterfly valve 810b was opened and the powder was dropped into the liquefaction chamber 820. The plastic liquefied within 15 seconds after it was poured into the liquefaction chamber 820. The plastic flowed out of the liquefaction chamber 820 similar to honey.

3.3.3.2. Analysis

The polyethylene powder fully liquefied immediately and created a seal between the liquefaction chamber and atmosphere. The average flow rate of the plastic was about 4 grams per minute. The plastic had a similar consistency to that of honey.

3.3.4. Experiment—Continuous Feeding
3.3.4.1. Procedure and Results

The system 80 was heated to a temperature of around 200° C. and the liquefaction chamber 820 was purged with nitrogen through inlet 840. Then, 20 grams of polyethylene powder was added to the compression chamber 800 and the top butterfly valve 810a was shut. This compression chamber 800 was then purged with nitrogen through inlet 830 at a flow rate of 0.6 liters per minute. After 30 seconds, the bottom butterfly valve 810b was opened and the powder entered the liquefaction chamber 820. The bottom butterfly valve 810b was then closed. After 3 minutes, 25 more grams of plastic was added to the compression chamber 800, the chamber 800 was pressurized, and the bottom butterfly valve 810b was opened. At 6 minutes these steps were repeated. Glass lenses were used to catch the plastic, which were switched out every minute. After the plastic solidified, its mass was found using a scale. The solidified plastic is labeled corresponding to the minute the mass was measured. The average flow rate was calculated to be about 9 grams per minute.

3.3.4.2. Analysis

The average flow rate is 8.98 grams per minute. This flow rate is at a constant pressure.

3.3.4.3. Conclusion

The flow rate increases immediately after more plastic is added to the liquefaction chamber. This may be due to the amount of liquid increasing rapidly which increases the height of the plastic in the liquefaction chamber, increasing the pressure on the plastic flowing out from the bottom of the chamber. This experiment shows that the compression chamber allows the plastic to be continuously fed, even though the flow is not necessarily steady.

3.4. Stage 4—Pyrolyzing the Plastic and Igniting a Flame
3.4.1. Purpose

In the fourth stage of testing, the pyrolysis chamber was added to the test fixture. The objectives of this stage of testing were to use a Bunsen burner placed underneath the pyrolysis chamber to liquefy plastic, allow it to flow into the pyrolysis chamber, and gasify it inside the pyrolysis chamber. Once it was a gas, it was allowed to flow out of the exhaust hose and a lighter was used to observe the presence of the pyrolyzed plastic gas. A nitrogen input added to the experiment for Stage 3 was used to make sure there is no oxygen flowing into the pyrolysis chamber.

Figure 10:
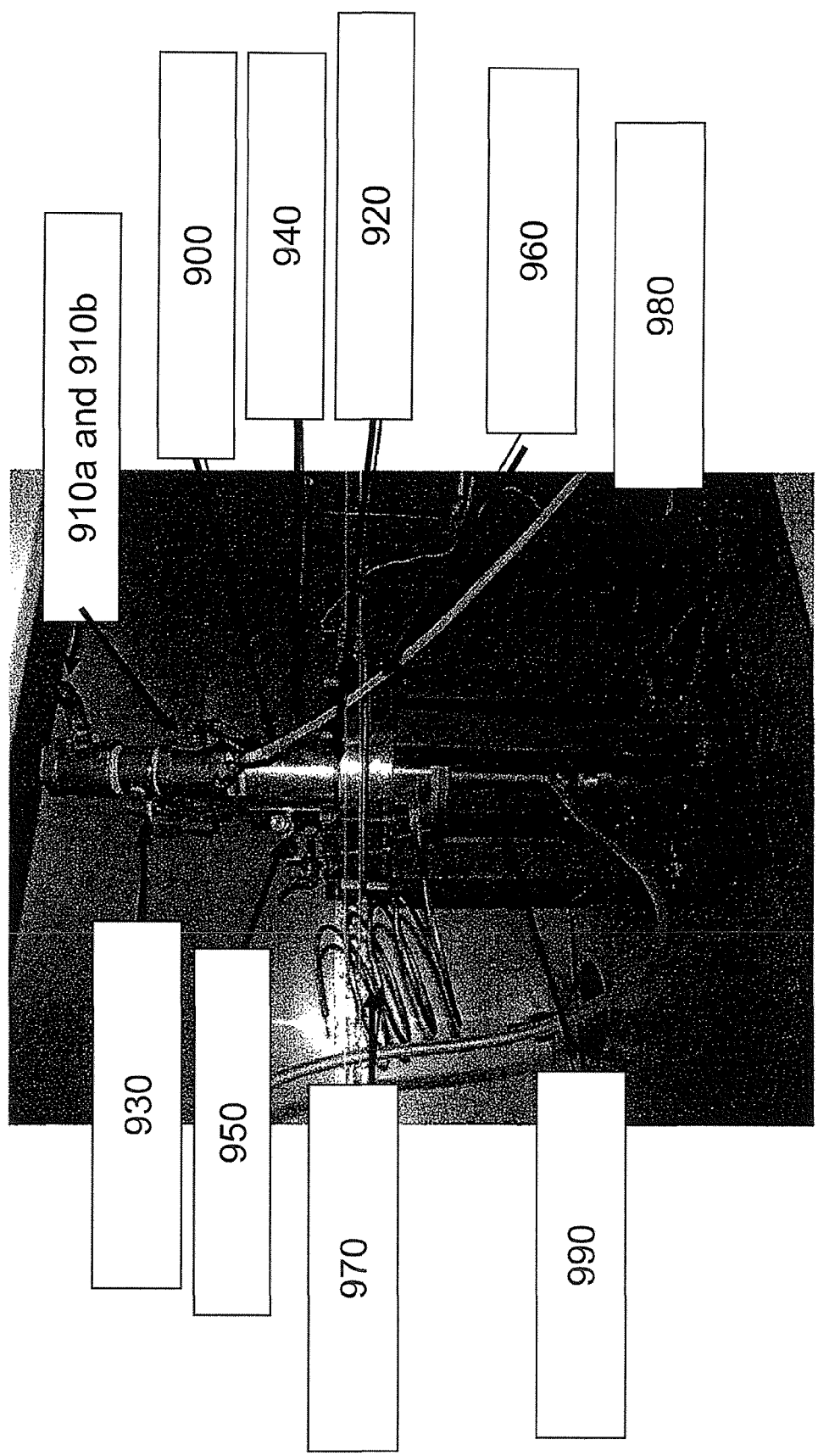
FIG. 10 is a picture of an experimental system comprising a compression chamber, a liquefaction chamber, a pyrolysis chamber, and a Bunsen burner (acting as a combustion element).

3.4.2. Equipment
  Steel liquefaction chamber and pyrolysis chamber
  180 Watt heat wrap
  2 psi release valve
  Copper tubing
  Thermocouple and DAC
  Stop watch
  Camera
  Polyethylene powder (300 11 m)
  Balance
  Flow hood
  Pressure Gauge 3.4.3. Experiment—Preheat System and Load Plastic to Determine Ability to Pyrolyze Plastic
3.4.3.1. Procedure and Results The pyrolysis chamber 960 was added to a feeder (not shown), compression 900, and liquefaction chamber 920 setup to form a system 90 (FIG. 10). The two nitrogen input valves 930 and 940 produced pressures between 0.5 and 1 psi in the compression 900 and liquefaction chambers 920. The Bunsen burner 990 was allowed to run until the liquefaction chamber 920 reached 200° C. and both butterfly valves 910a (top valve) and 910b (bottom valve) were closed. Every minute, 2 grams of polyethylene was added, a number determined by the results of the previous experiments. A support fixture 980 was placed under the pyrolysis chamber 960 to support the weight of the system during the experiment (FIG. 10). The system 90 also included an exhaust 970 to release gases (the exhaust is shown as coiled piping). An additional release valve 950 was also included in the system 90.

3.4.3.1. Analysis

With the presence of the clean flame, it is shown the gasified plastic is flowing through the system to the pyrolysis chamber where it is gasified and exits through the exhaust pipe.

3.4.3.2. Conclusion

This experiment shows the successful introduction of the pyrolysis chamber into the system. Because the gas exiting from the pyrolysis chamber is not premixed and there are losses of heat through the exhaust pipe, an external flame is needed to light the gas.

3.4.4. Overall Conclusion

From the results of stage four it can be concluded that the device can produce plastic pyrolyzed gases effectively. This stage allows confirmation that each chamber from the compression chamber to the pyrolysis chamber will work in the current design.

The invention claimed is:

1. A method of generating power from solid organic waste material, the method comprising:
  a) heating the solid organic waste material to form a liquid;
  b) pyrolyzing the liquid to obtain one or more gaseous decomposition products;

c) mixing the one or more gaseous decomposition products with an oxidizing gas to form a mixture;

d) burning and igniting the mixture to produce thermal energy;

e) supplying a fraction of the thermal energy as process heat to perform a) and b); and f) supplying a fraction of the thermal energy to a heat engine that converts the thermal energy into power.

2. The method of claim 1, wherein pyrolyzing the liquid is performed in an inert atmosphere.

3. The method of claim 1, wherein the thermal energy is produced by a pre-mixed fuel lean flame.

4. The method of claim 1, wherein the fuel-air equivalence ratio is less than 1.

5. The method of claim 1, wherein the solid organic waste material is selected from the group of common post-consumer polymers, polyethylene, polypropylene, and polystyrene.

6. The method of claim 1, wherein the oxidizing gas is oxygen.

7. The method of claim 1, wherein a) through d) are each performed in separate chambers.

8. The method of claim 7, wherein the chambers are positioned in a vertical alignment.

9. The method of claim 8, wherein the chamber for performing a) is positioned above the chamber for performing b), the chamber for performing b) is positioned above the chamber for performing c), and the chamber for performing c) is positioned above the chamber for performing d).

10. The method of claim 9, further comprising pressurizing the interior of the chamber for performing a) to a pressure higher than atmospheric pressure.

11. The method of claim 10, wherein the chamber for performing a) is pressurized with an inert gas.

12. The method of claim 10, wherein the pressure in the chamber for performing a) is higher than the pressure in the chamber for performing b), the pressure in the chamber for performing b) is higher than the pressure in the chamber for performing c), and the pressure in the chamber for performing c) is higher than the pressure in the chamber for performing d).

13. The method of claim 1, wherein the heat engine is a turbine.

* * * * *